US008123317B2

(12) United States Patent
Ikeda

(10) Patent No.: US 8,123,317 B2
(45) Date of Patent: Feb. 28, 2012

(54) INK TANK AND PRINTING APPARATUS

(75) Inventor: Masumi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/485,387

(22) Filed: Jun. 16, 2009

(65) Prior Publication Data

US 2009/0315960 A1 Dec. 24, 2009

(30) Foreign Application Priority Data

Jun. 20, 2008 (JP) ................................ 2008-161760

(51) Int. Cl.
*B41J 2/195* (2006.01)
*B41J 2/175* (2006.01)
*G01F 23/00* (2006.01)

(52) U.S. Cl. ................................ 347/7; 347/86; 73/293

(58) Field of Classification Search .................. 347/5, 7, 347/49, 85, 86; 73/290 R, 293; 250/227.11, 250/573; 116/227

See application file for complete search history.

(56) References Cited

U.S. PATENT DOCUMENTS 6,158,837 A * 12/2000 Hilton et al. .................... 347/19
6,293,143 B1 * 9/2001 Denton et al. .................. 73/293
6,361,136 B1 * 3/2002 Watanabe et al. ................ 347/7
6,767,075 B1 * 7/2004 Takada et al. ................... 347/19
6,966,642 B2 * 11/2005 Hanaoka et al. ................ 347/86
7,137,688 B1 * 11/2006 Andersen et al. ............... 347/70
2002/0140750 A1 10/2002 Yoshiyama et al. .............. 347/7
2008/0129804 A1 6/2008 Fukushima et al. ............ 347/86

FOREIGN PATENT DOCUMENTS

| | | |
|---|---|---|
| DE | 101 17 885 | 10/2002 |
| JP | 7-218321 | 8/1995 |
| JP | 10-323993 | 12/1998 |
| JP | 2006-159789 | 6/2006 |

OTHER PUBLICATIONS

Extended European Search Report dated Oct. 29, 2009, from corresponding European Application No. 09163312.3.
Korean Office Action dated Apr. 1, 2011 in corresponding Korean Application No. 10-2009-0054943.
Russian Official Action dated Sep. 14, 2010, from corresponding Russian Application No. 2009123460/12(032478), and English language translation thereof.

* cited by examiner

*Primary Examiner* — Anh T. N. Vo
(74) *Attorney, Agent, or Firm* — Fitzpatrick, Cella, Harper & Scinto

(57) ABSTRACT

To implement an ink tank and a printing apparatus that can detect a residual quantity of ink in an ink containing part optically with high accuracy by solving a problem of false detection of an ink residual quantity caused by irregular reflection light and scattered light generated by light from a light emitting part. For that purpose, the light source for emitting light of a first wavelength and the light receiving part for receiving light of a second wavelength are provided. Then the light of the first wavelength from the light source is configured to be irradiated on a luminescent material that is provided in the ink tank and emits the light of the second wavelength using an optical prism only when the ink does not exist in the ink tank.

8 Claims, 7 Drawing Sheets

INK TANK AND PRINTING APPARATUS

BACKGROUND OF THE INVENTION

1. Field of the Invention

The present invention relates to an ink tank and a printing apparatus that can detect a residual quantity of ink in the ink tank, as well as a method of detecting the residual quantity of ink.

2. Description of the Related Art

Generally, as an ink supply source for various printing apparatuses including inkjet printing apparatuses, an ink tank of a cartridge type (hereinafter referred to as an ink cartridge) is adopted. Many ink cartridges that are detachable from respective printing apparatuses are known.

When ink in the ink cartridge is used up, a problem may occur in that a printing operation may be ceased halfway. In order to overcome this, there are proposed various mechanisms for detecting the ink residual quantity in the ink cartridge so that the ink or the ink cartridge may be replenished or replaced before the ink is used up and/or between printing operations. There are several mechanisms proposed as detection mechanisms for detecting the residual quantity of ink in the ink cartridge. For example, there is a mechanism for detecting the residual quantity of ink by checking a conduction state between electrodes provided in the ink cartridge. There is further a mechanism for detecting the residual quantity of ink by optical means, etc. Since means for detecting the existence or absence of the ink optically is simple in configuration and does not need a large device, it is employed in many ink cartridges.

As a mechanism for detecting the ink residual quantity optically, for example, Japanese Patent Laid-open No. H07-218321 (1995) proposes a mechanism using a prism. A detector mechanism for the ink residual quantity using the prism is equipped with a light-emitting part and a light-receiving part on the printing apparatus containing the ink cartridge, and is equipped with a prism reflecting surface that is constructed with a light transparent material, such as polypropylene, on or in the ink cartridge. When the ink in the ink cartridge is used up and an interface of the reflecting surface of the prism changes from polypropylene: ink to polypropylene: air, this causes a change of relative refractive index and the light from the light emitting part on the printing apparatus side undergoes total reflection on the reflecting surface of the prism, and is detected by the light receiving part on the printing apparatus side. The existence or absence of the ink in the ink cartridge is thus detected based on such a change of optical reflective intensity.

In the mechanism for detecting the existence and absence of the ink in the ink cartridge based on such a change of optical reflective intensity, there is a case where irregular reflection light and scattered light generated by the light from the light emitting part, in addition to the reflected light, may reach the light receiving part. The irregular reflection light and scattered light cannot always be discriminated from the reflected light coming from the prism, which can cause false detection of the existence or absence of the ink.

In order to overcome this, Japanese Patent Laid-open No. H10-323993 (1998) reports a method for detecting the existence and absence of the ink more accurately by providing a concave polyhedron in a prism basal plane part, and thereby reducing the reflected light in the prism basal plane part. Another method for detecting the existence and absence of the ink more accurately provides polarizing plates in front of the light-emitting part and the light-receiving part, and also means for changing an oscillating direction of the light immediately before the prism, and thereby reducing light other than the reflected light that is reflected at a boundary surface between the prism and the ink. However, with these methods, there is a risk that the reflected light reaching the light receiving part may decrease, thus rendering the result less robust.

Japanese Patent Laid-open No. 2006-159789 discloses a method for detecting the ink residual quantity based on light emitted by a luminescent material. Specifically, the ink contains the luminescent material. This method can solve a problem of the irregular reflection light and scattered light generated by the light from the light emitting part because the wavelength of the light emitted by the light emitting part and a wavelength of the light received by the light receiving part are different from each other. However, this method comes with a restriction that the luminescent material must be added into the ink.

SUMMARY OF THE INVENTION

It is desirable to solve the problems in the conventional technology described above. That is, it is desirable to solve a problem of false detection of an ink residual quantity caused by the irregular reflection light and scattered light generated by light from a light emitting part and thereby to implement an ink tank and a printing apparatus that detect the residual quantity of ink in an ink-containing part of a printing apparatus optically with high accuracy. It is desirable to provide an ink residual quantity detection system, and a method for detecting the ink residual quantity.

The present invention provides an ink tank for a printing apparatus. The present invention in its first aspect provides an ink tank comprising an ink-containing part for containing ink and optical detecting means for optically detecting a presence or an absence of ink in the ink-containing part. The optical detecting means comprises a luminescent material and a light-reflecting part for reflecting irradiation light irradiated from the outside of the ink-containing part onto the luminescent material, so that the luminescent material is excited by the light that has been reflected by the light reflecting part and emits light of a wavelength that is different from a wavelength of the irradiation light. In some embodiments, when ink is not present in the ink-containing part, the optical detecting means is arranged such that the luminescent material receives the reflected light from the light-reflecting part and emits light. In some embodiments, the optical detecting means comprises a light-shielding part, and when ink is present in the ink-containing part, the optical detecting means is arranged such that the luminescent material is shielded by the light-shielding part from reflected light. The light-reflecting part may be formed at an interface between the ink-containing part and a prism, and may be arranged to refract the irradiation light so as not to reflect the irradiation light to the luminescent material when ink is present in the ink-containtng part. The luminescent material may be provided in the interior of the prism, or may be provided outside the prism. The present invention in its second aspect provides a printing apparatus capable of carrying an ink tank as described herein, wherein the printing apparatus comprises light-emitting means for irradiating light with a first wavelength onto the light-reflecting part of the ink tank, light-receiving means for receiving light emitted from the ink tank, a detector for detecting received light with a second wavelength emitted by the luminescent material in the ink tank, and determining means for determining the residual quantity of ink in the ink tank based on an amount of light with the second wavelength detected by the detector. Some embodiments of the printing apparatus further comprise a carriage for mounting the ink tank together with a printing head for ejecting the ink from the ink tank, and/or processing means for determining whether the printing should be performed depending on the result of the determining means. According to a third aspect, there is provided a method of detecting ink in an ink tank wherein the method comprises irradiating light with a first wavelength from a light source; directing the irradiated light into a prism in the ink tank, the prism having a refractive index chosen so that if the prism has an interface with ink, the irradiated light is refracted through that interface, and if the interface is with air, the irradiated light is totally internally reflected from that interface, the prism containing a luminescent material that emits light with a second wavelength when the irradiated light with the first wavelength is absorbed by the luminescent material; detecting light emerging from the prism; and determining, from the emerging light, whether the light has been refracted and ink is present in the ink tank, or the light has been totally internally reflected onto the luminescent material and ink is absent from the ink tank. Some embodiments further comprise displaying a notification indicating whether ink is present or absent in the ink tank based on the result of the determining step.

According to the present invention, the ink tank is equipped with a luminescent material that is excited by irradiation light irradiated from the outside being reflected at a light reflecting part to become reflected light. The luminescent material is irradiated by the reflected light and emits light of a wavelength different from that of the original irradiation light. By this, it is possible to solve the problem of the false detection of the ink residual quantity caused by the irregular reflection light and scattered light generated by the light from the light emitting part, and to implement the ink tank that can detect the ink residual quantity in the ink containing part optically with high accuracy.

Moreover, according to the present invention, the printing apparatus is equipped with light-emitting means for irradiating light to the light-reflecting part of the ink tank. The printing apparatus is also equipped with light-receiving means that can receive the light emitted by the luminescent material, which is itself capable of receiving the reflected light from the light-reflecting part. Then, the wavelength of the light emitted by the light-emitting means is made different from the wavelength of the light received by the light-receiving means. By this, it is possible to solve the problem of the false detection of the ink residual quantity caused by the irregular reflection light and scattered light generated by the light from the light-emitting part, and to implement a printing apparatus that is capable of detecting the ink residual quantity in the ink-containing part optically with high accuracy.

Further features of the present invention will become apparent from the following description of exemplary embodiments (with reference to the attached drawings).

DESCRIPTION OF THE EMBODIMENTS

First Embodiment

Figure 1A:
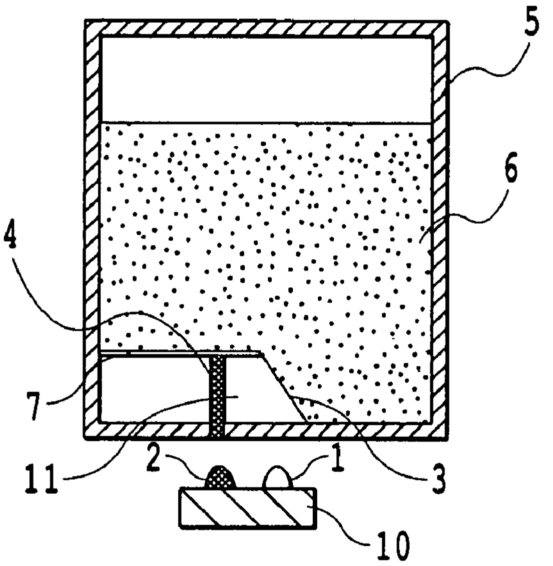
FIG. 1A is an outline block diagram of an ink residual quantity detection system according to a first embodiment.
Figure 1B:
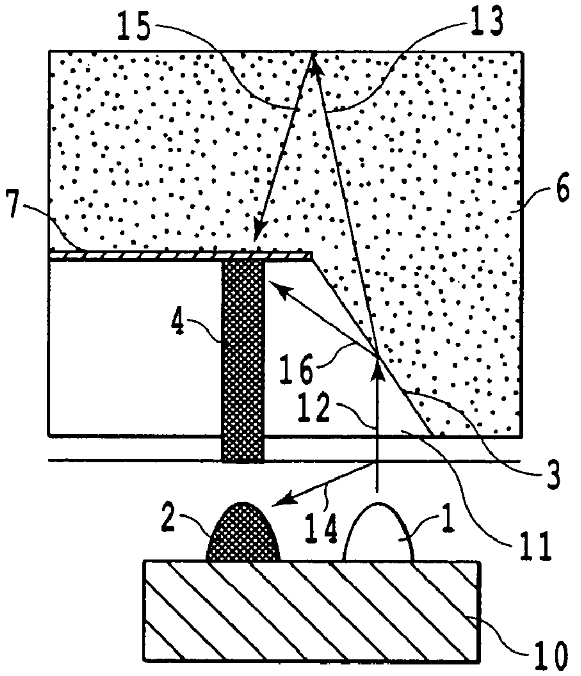
FIG. 1B is an explanatory diagram of an operation of the ink residual quantity detection system of FIG. 1A when ink is present.
Figure 1C:
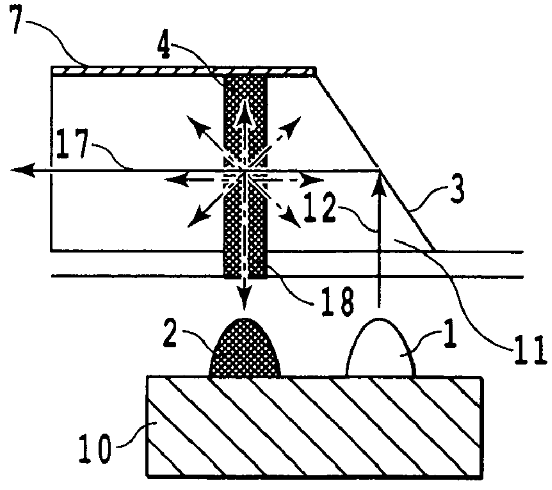
FIG. 1C is a diagram of an operation of the ink residual quantity detection system of FIG. 1A when there is no ink present.
Figure 2B:
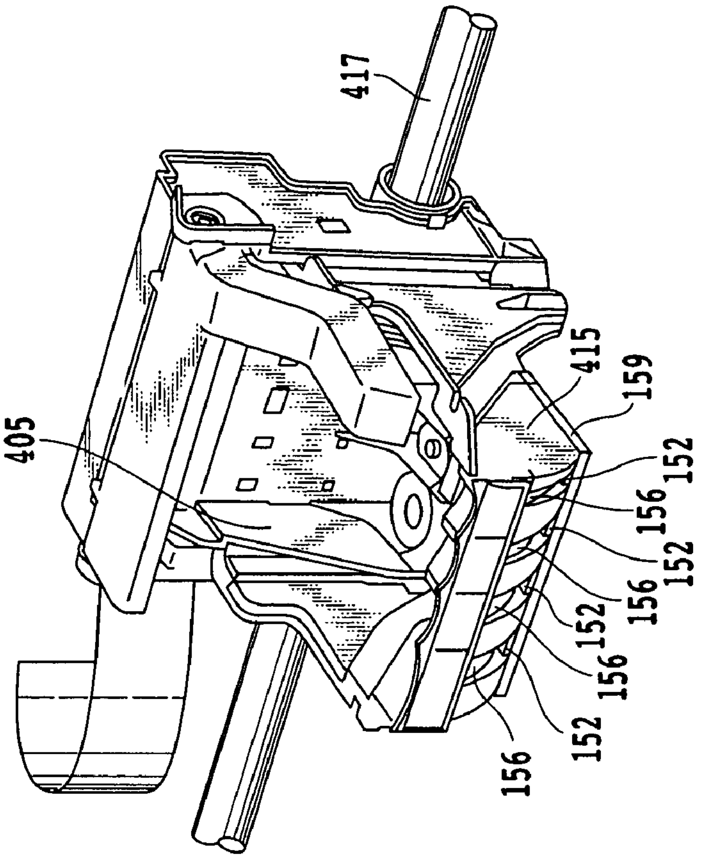
FIG. 2B is a perspective diagram showing a state where the both components of FIG. 2A are united.
Figure 2A:
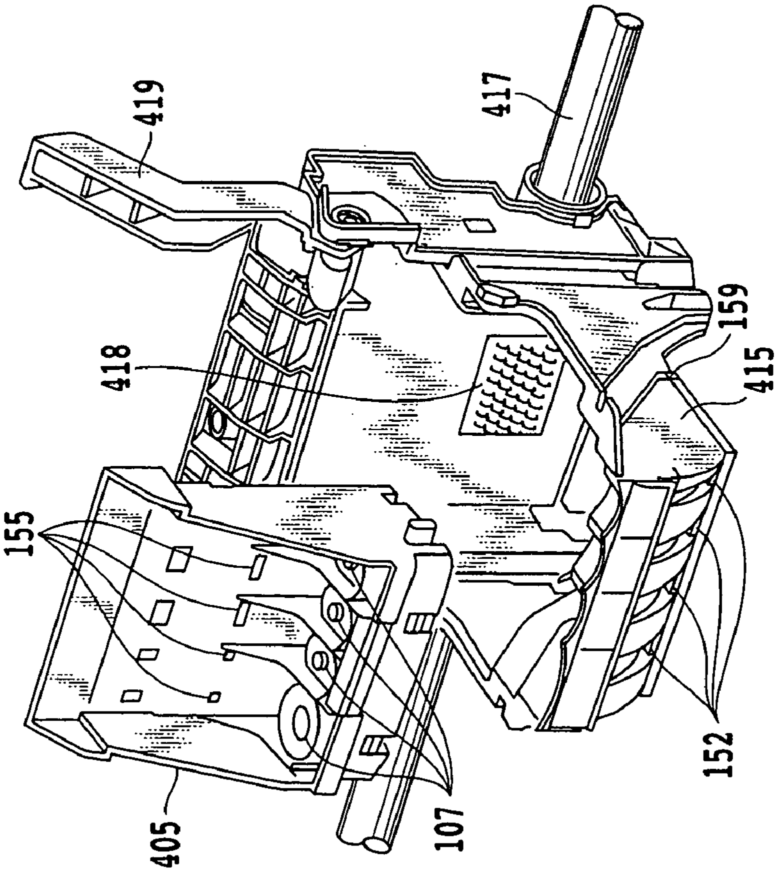
FIG. 2A is a perspective view of a configuration of a printing head unit and a carriage.

Hereafter, with reference to the drawings, a first embodiment of the present invention will be explained. FIG. 1A is an outline block diagram showing an ink tank 5 and a detector 10 for ink residual quantity detection in this embodiment. FIG. 1B is an explanatory diagram of an operation of the apparatus of FIG. 1A in the case of the presence of ink inside and FIG. 1C is an explanatory diagram of an operation in the case of the absence of ink inside. The ink tank 5 is capable of housing an ink 6 in its interior and has, on its bottom, an interface 3 of an optical prism 11 that changes refraction of light depending on the existence or absence of the ink, a light shielding part 7 for shielding light from the outside, and a luminescent material 4 that receives light of a first wavelength and emits light of a second, specific wavelength. Moreover, the detector 10 in which a light source 1 and a light-receiving part 2 are united in one piece is formed in a lower part of (or even below) the ink tank 5. A method for detecting an ink residual quantity using this detector 10 will be explained in detail later. FIG. 2A is a configuration example of a printing head unit 405 that receives supply of the ink from a plurality of ink tanks (each corresponding to a different color of ink) and executes a printing operation. A perspective view of a carriage 415 in which this unit is incorporated is also shown in the figure. FIG. 2B is a perspective view showing a state where the both members (the printing head and the carriage) of FIG. 2A are united together.

Recording heads corresponding to different colors of inks in the ink tanks are provided in a printing head unit 405. For each recording head, the printing head unit 405 has an ink inlet 107 connected to an ink supply port provided in the bottom of each ink tank, a first latching part 155 on a front surface of a back portion of the printing head unit 405 for latching the respective color ink tank to the printing head unit 405, and an electric contact for signal transmission (not illustrated) on a rear face of the back portion of the printing head unit 405.

A carriage 415 movable along a shaft 417 is provided with a holder part that corresponds in shape to a structure of a front portion of the ink tank. The front portion of the ink tank is the portion that is opposite the back portion that latches into the latching parts 155 of the printing head unit 405. A lever 419 is provided for mounting and fixing the printing head unit 405. An electric contact part 418 is also provided for connection to a printing head side electric contact part, in a manner shown in FIG. 2B. A second latching part 156 corresponding to each recording head/ink tank assembly, a connector 152 corresponding to each recording head/ink tank assembly, and a wiring part 159 wired to the connectors 152 are arranged at specified positions on the carriage 415. The printing apparatus as a whole becomes in a recordable state by mounting the respective ink tank 5 on the respective printing head unit 405 and equipping the carriage 415 with the printing head unit 405. In this state, the printing head is able to eject the ink from the printing head while the carriage 415 moves across the surface of a printing medium (such as paper), and thereby printing on the printing medium is performed.

Configuration of Control System

Figure 3:
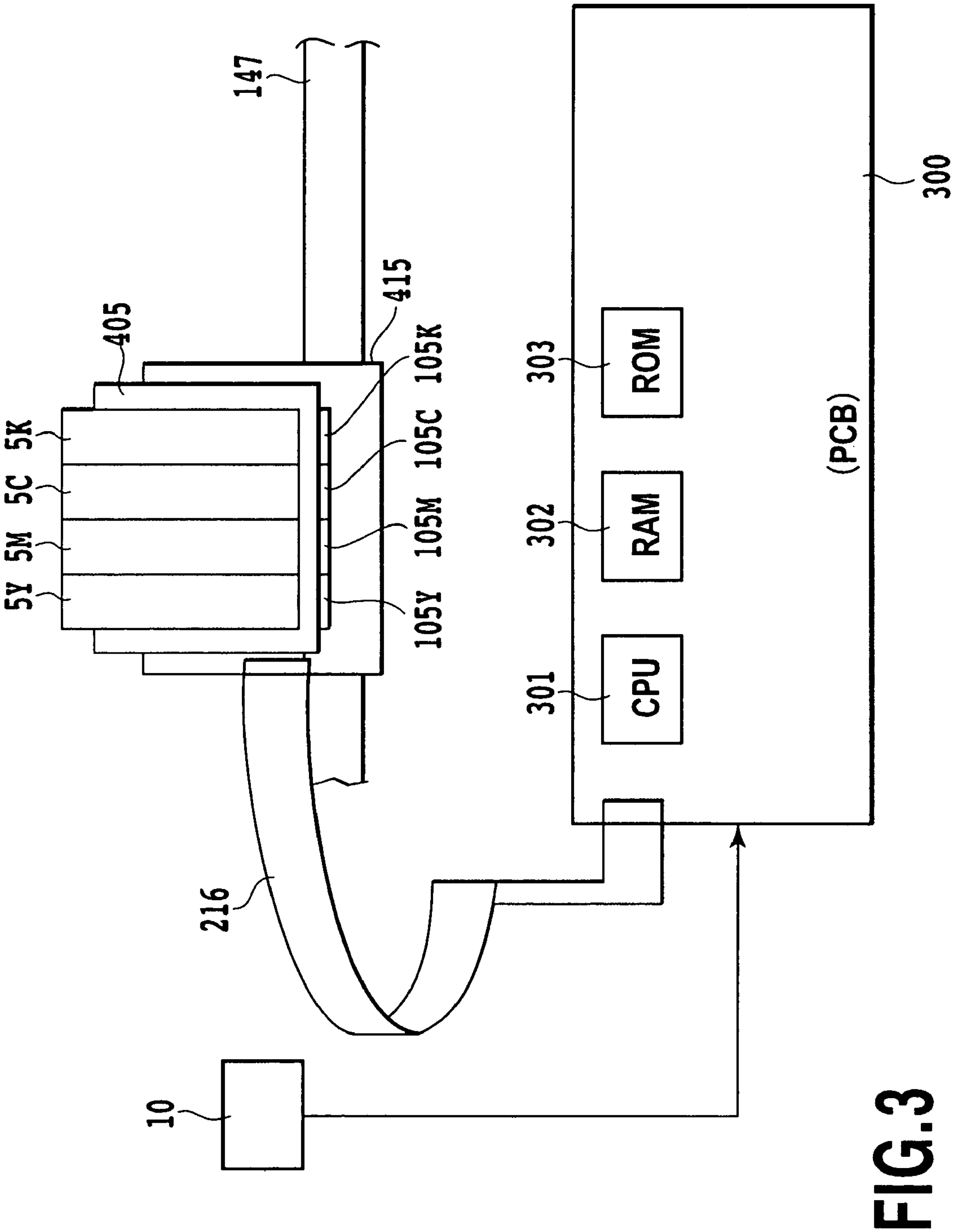
FIG. 3 is a block diagram showing a control system of an inkjet printing apparatus.

FIG. 3 is a block diagram showing a configuration example of a control system of an inkjet printing apparatus described above. A control circuit 300 performs data processing and operation control for the printing apparatus. Specifically, a CPU 301 performs the processing according to a program stored in ROM 303. RAM 302 is used as a work area when the CPU 301 performs the processing.

As shown schematically in FIG. 3, the printing head unit 405 mounted on the carriage 415 is equipped with printing heads 105K, 105Y, 105M, and 105C in which a plurality of ejection openings for ejecting respective inks of black (K), yellow (Y), magenta (M), and cyan (C) are formed. In addition, the ink tanks 5K, 5Y, 5M, and 5C (corresponding to each color of ink) are mounted detachably on the holder of the printing head unit 405 correspondingly to these printing heads. The printing head unit 405 and carriage 415 assembly is connected to the control circuit 300 by electrical connector 216, though the connection system may also be wireless. The detector 10, which is used for determining the residual quantity of the ink in the ink tanks as mentioned above is also connected to the control circuit 300.

Figure 4A:
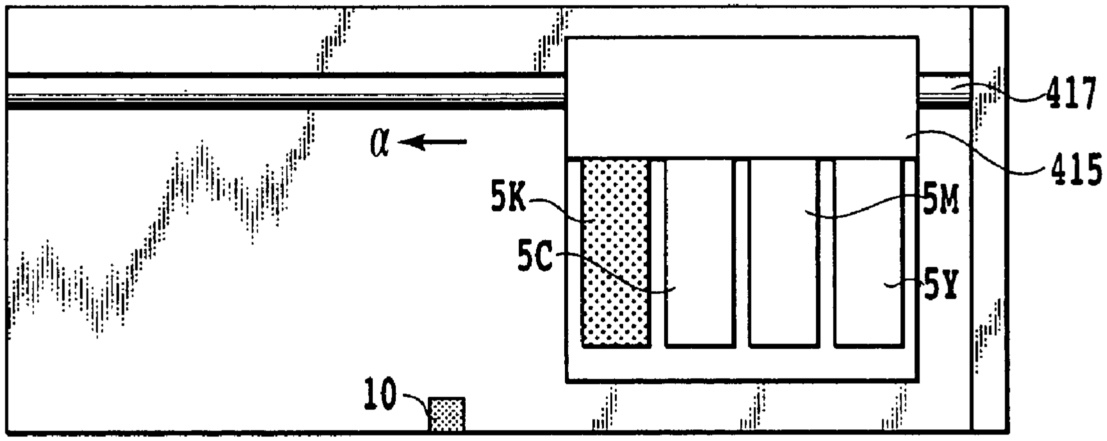
FIG. 4A is a schematic diagram showing a carriage before detection of the ink residual quantity.
Figure 4B:
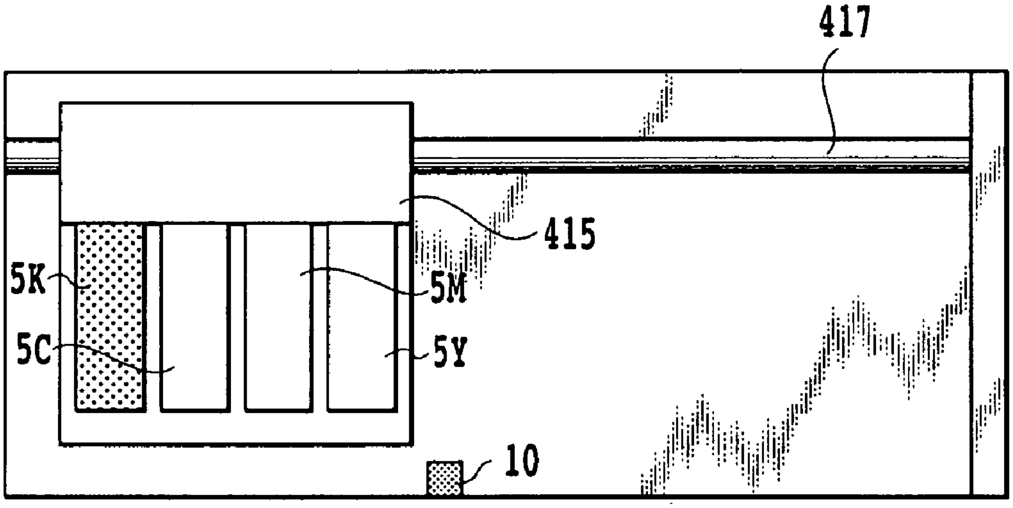
FIG. 4B is a schematic diagram showing the carriage after the detection of the ink residual quantity.

FIG. 4A is a schematic diagram showing the carriage 415 before detection of the ink residual quantity; FIG. 4B is a schematic diagram showing the carriage 415 after the detection of the ink residual quantity. When a printing process is started by a user, the carriage 415 starts to move in an a direction of an arrow of FIG. 4A (i.e. to the left as viewed in the figure). Then, when the each ink tank 5 (5K, 5Y, 5M, and 5C) comes to a position of the detector 10, the detector 10 performs the ink residual quantity detection to the each ink tank 5.

In this embodiment, the light emitted by the light source 1 (see FIG. 1A) that is provided in the detector 10 is made to be received by the light receiving part 2 after its wavelength is changed by the luminescent material 4. That is, the detector 10 is configured so that the light receiving part 2 may be able to detect only the wavelength of the light emitted by the luminescent material 4 (and not the wavelength of the originally emitted light by the light source), and therefore false detection (by detection of the light source light) of the ink residual quantity is prevented. However, detectors may be used that measure both the wavelength of the emitted light and the wavelength of the luminescent material output light and the amount of light emitted with each wavelength may be compared to determine a relative output amount. The residual amount of ink may be determined by comparing the relative amounts of light with each wavelength being output. This method will be explained in detail below.

The luminescent material 4 is a material, such as fluorescent material or a phosphorescent material, that emits light by optical excitation, and among them, one whose absorption wavelength and luminescent wavelength are separated from each other is desirable. As raw materials of such luminescent materials, rhodamine derivatives, perylene derivatives, pyrene derivatives, fluorescein derivatives, etc., all of which have absorption bands and emission bands in ultraviolet and visible regions, can be enumerated. In addition, inorganic infrared emitting phosphors containing neodymium (Nb), ytterbium (Yb), or erbium (Er) each of which has absorption and emission bands in the visible and infrared regions and the like may be used. Further, infrared emitters containing polyester, infrared emitter containing phthalocyanine, or the like may be used. Any other materials that do not deviate from the scope of the present invention can be used.

Any light source 1 for which the light emitting band overlaps an absorption band of the luminescent material 4 can be used, and ultraviolet LEDs, visible LEDs, and infrared LEDs, etc., are suitable. Any light source other than these can be used provided that it does not deviate from the scope of the present invention.

Table 1 shows combinations of the luminescent materials, light-emitting elements and light-receiving elements that can be used in the present invention.

TABLE 1

Combination of luminescent material, light emitting element, and light receiving element

| Luminescent material: Product name (Material name) | Luminescent material: Recommended excitation wavelength | Luminescent material: Emission wavelength | Light emitting element: Manufacturer | Light emitting element: Product name | Light emitting element: Emission wavelength | Light receiving element: Manufacturer | Light receiving element: Product name | Light receiving element: Product's light reception wavelength |
|---|---|---|---|---|---|---|---|---|
| Fluorescein (Free Acid) | 490 nm | 514 nm | Company N | NSPB300B | 470 nm | Company T | TPS856 | 550 nm |
| Sulforhodamine B acid chloride | 560 nm | 580 nm | Company T | TLPGU50T(F) | 558 nm | Company T | TPS853 | 600 nm |

TABLE 1-continued

Combination of luminescent material, light emitting element, and light receiving element

| Luminescent material | | | Light emitting element | | | Light receiving element | | |
|---|---|---|---|---|---|---|---|---|
| Product name (Material name) | Recommended excitation wavelength | Emission wavelength | Manufacturer | Product name | Emission wavelength | Manufacturer | Product name | Product's light reception wavelength |
| NIR 4f (Product of Fluka) | 657 nm | 822 nm | Company T | TLRE50T(F) | 630 nm | Company T | TPS820(B, F) | 870 nm |
| Fluoresbrite | 377 nm | 479 nm | Company N | NSPU510CS | 375 nm | Company T | TPS856 | 550 nm |
| Multifluorescent | 517 nm | 546 nm | Company N | NSPG300A | 520 nm | Company T | TPS856 | 550 nm |
| Microsphares (Product of Techno Chemical Corporation)* | 588 nm | 612 nm | Company T | TLYU160(F) | 587 nm | Company T | TPS853 | 600 nm |
| La2O2s: Eu | 380 nm | 650 nm | Company N | NSPU510CS | 375 nm | Company T | TPS850 | 640 nm |
| BaMgAl10O17: Eu | 380 nm | 460 nm | Company N | NSPU510CS | 375 nm | Company T | TPS856 | 550 nm |

Company T . . . Toshiba Corporation Semiconductor Company
Company N . . . Nichia Corporation In this embodiment, the optical prism 11 for detecting the existence or absence of the ink optically is molded integrally with the ink tank 5, and is provided at the bottom of the ink tank 5. As shown in FIG. 1B, when the ink 6 exists, incident light 12 of a wavelength λ1 from the light source 1 is refracted at the interface 3 of the optical prism 11, becoming refracted light 13 of the wavelength λ1. After this, the refracted light 13 is reflected on the surface of the ink and becomes refracted light 15, and the refracted light 15 reaches the light shielding part 7; therefore it does not reach the luminescent material 4. Although there is a case where light 14 generated through scattering of the incident light 12 (and light generated through reflection thereof at another interface) reaches the light receiving part 2 directly, the light receiving part 2 does not recognize the light 14 of the wavelength λ1 because it recognizes only the light of a wavelength λ2 that the luminescent material 4 can emit.

There is a possibility that light 16 of the wavelength λ1 scattered in the interior and at the interface 3 of the optical prism 11 may reach the luminescent material 4. If the light 16 reaches the luminescent material 4 and excites the luminescent material 4, it will emit the light of the wavelength λ2, and the light receiving part 2 will recognize the light, which will cause the false detection. However, since the light 16 is very weak light, the quantity of the luminescent material that is excited is small. Even if the luminescent material 4 is excited and emits the light of the wavelength λ2, the false detection can be avoided by setting a threshold of the quantity of light at the light receiving part 2.

Therefore, when the ink 6 is contained in the ink tank 5, the light receiving part 2 does not recognize the light, and there is no judgment (misconception) that the ink 6 does not exist.

As shown in FIG. 1C, when the ink 6 does not exist in the ink tank 5, the incident light 12 of the wavelength λ1 undergoes total reflection (or total internal reflection) at the interface 3, becomes totally (internally) reflected light 17 of the wavelength λ1, and is irradiated on the luminescent material 4. The luminescent material 4 is excited by the totally reflected light 17, and emits light 18 of the wavelength λ2 different from the wavelength λ1. Since the light 18 emitted by the luminescent material 4 is emitted isotropically, it reaches the light receiving part 2, and the light receiving part 2 recognizes that the ink 6 does not exist in the ink tank 5. Therefore, when the ink 6 is not contained in the ink tank 5, the light receiving part 2 recognizes the light and the misconception that the ink 6 is judged to exist in the ink tank 5 does not occur.

Figure 5:
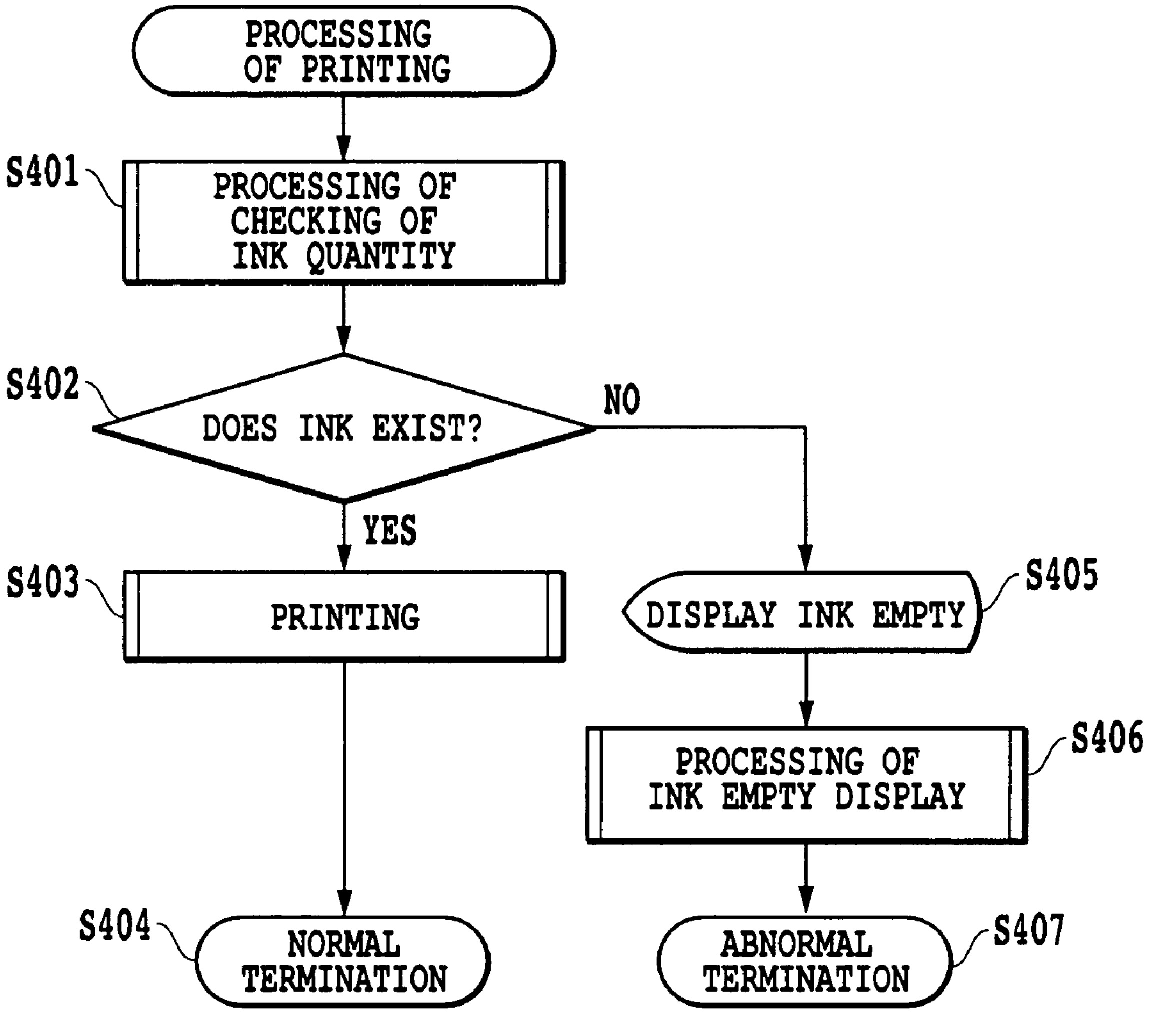
FIG. 5 is a flow chart showing a printing process.

FIG. 5 is a flow chart showing the printing process according to this embodiment. In this process, first, an ink residual quantity check process is performed at Step S401. In this process, the amount of printing of a job that is intended to be recorded is found from its printing data, and it is checked whether the ink tanks have sufficient quantities to record the job by comparing the printing quantity and the residual quantities of the respective ink tanks. In this process, for the ink residual quantity, what is obtained by the control circuit 300 measuring the residual quantity at that time can be used.

At Step S402, it is judged whether the ink quantity required for printing exists based on the above-mentioned check process. When there is a sufficient ink quantity, the printing operation is performed at Step S403, an indicator that indicates that an operation part is functioning is turned on (for example, in green) at Step S404, and normal termination is performed. On the other hand, when it is judged that the sufficient ink does not exist at Step S402, the indicator of the operation part indicates this, for example by blinking in orange at Steps S405 and S406, and abnormal termination is performed at step S407.

Thus, in summary, the light source 1 for emitting the light of a first wavelength and the light-receiving part 2 for receiving the light of a second wavelength are provided in the printing apparatus. Then, when the ink exists in the ink tank 5, the light being emitted by the light source 1 and coming through the optical prism 11 is obstructed from being irradiated on the luminescent material 4 by the light shielding part 7. Then, the light of the first wavelength from the light source 1 is configured to be irradiated on the luminescent material 4 that is provided in the ink tank and emits the light of the second wavelength only when the ink 6 does not exist in the ink tank 5. The luminescent material 4 thus emits the light of the second wavelength, and the light receiving part receives this light of the second wavelength and thereby recognizes that the ink does not exist in the ink tank. Thus, the ink tank and the printing apparatus that are capable of detecting the ink residual quantity in the ink tank optically with high accuracy are able to be implemented.

In this embodiment, although the luminescent material 4 is provided in the ink tank 5, it may be in the printing apparatus main body, not in the ink tank 5. However, it is anticipated that light emitting performance will deteriorate due to repeated detection for many times. It is therefore desirable for the ink tank 5 to be equipped with the luminescent material 4 so that its exchange can be done easily.

The printing apparatus of the present invention can carry the ink tank 5 used in the above-mentioned ink residual quantity detection system, and actually adopts the above-mentioned ink residual quantity detection system.

The ink tank 5 (an ink cartridge) can be manufactured by including following steps:

Forming a space (an ink storage space) for storing both the ink 6 and the optical prism 11, which is for optically detecting the existence or absence of the ink in the ink storage space.

Attaching the luminescent material 4 that is excitable by the external light irradiated from the outside of the ink tank 5 and capable of emitting light to the ink tank 5.

Forming the ink storage space and an ink supply part for making the ink storage space communicate with the outside.

The following method is considered for attaching the luminescent material 4 to the ink tank 5. The ink storage space, the optical prism 11, and a section of the luminescent material 4 are molded by two color molds using a first resin not containing the luminescent material 4 and a second resign containing the luminescent material 4. In this case, it is no problem as to which resin is molded first as long as desired shapes are formed. The first resin and the second resin may be the same resin or may be different resins.

A part containing the luminescent material 4 of the ink tank 5 and a part not containing it may be molded separately, and after that the two members may be fused by an ultrasonic wave or heat and adhered by an adhesive. A method is described below for introducing the luminescent material 4 into the part for containing the luminescent material 4. First, the luminescent material 4 is applied to the molded resin. The resin is made to contain the luminescent material 4. The part that is to contain the luminescent material 4 is molded with this resin, and a sheet containing the luminescent material 4 is stuck to the molded resin. Any suitable method may be imagined by the skilled person.

Second Embodiment

Figure 6A:
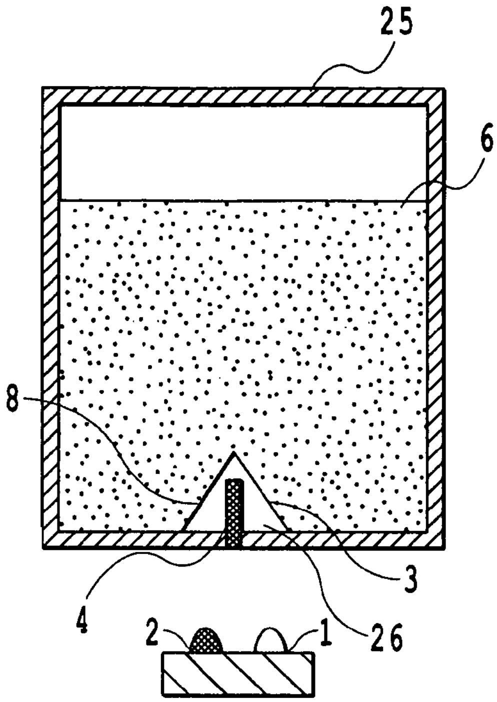
FIG. 6A is an outline block diagram of an ink residual quantity detection system according to a second embodiment.
Figure 6B:
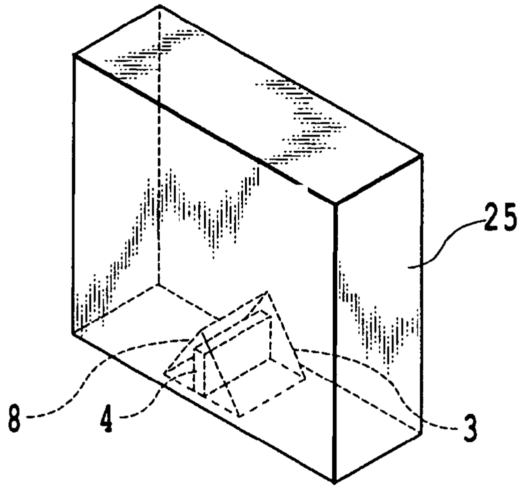
FIG. 6B is an outline perspective diagram of the ink residual quantity detection system of FIG. 6A.
Figure 6C:
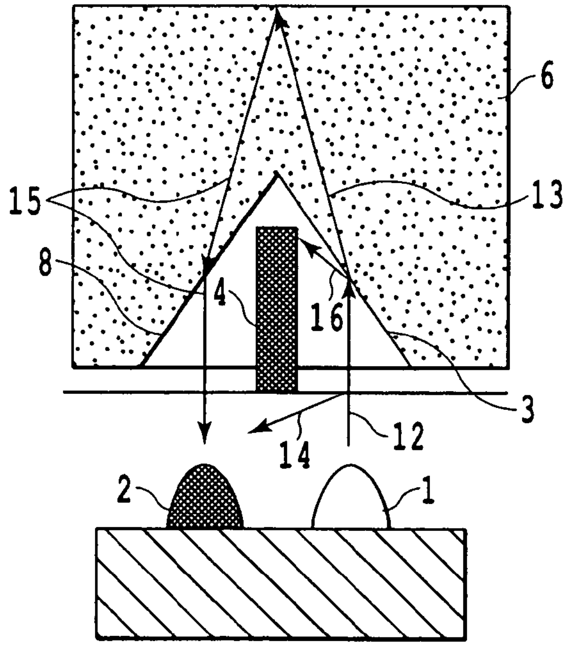
FIG. 6C is an explanatory diagram of an operation of the ink residual quantity detection system of FIG. 6A in the case of presence of ink.
Figure 6D:
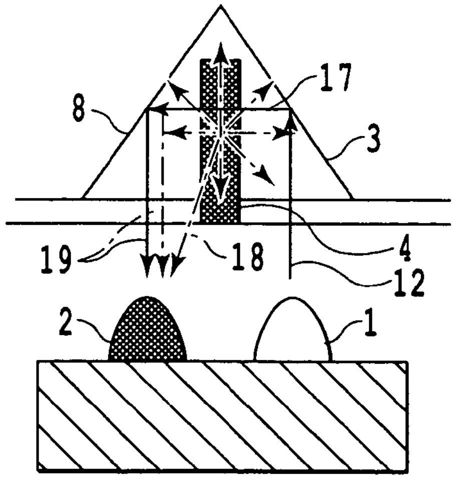
FIG. 6D is an explanatory diagram of an operation of the ink residual quantity detection system of FIG. 6A in the case of absence of ink.

Below, a second embodiment of the present invention will be explained with reference to the drawings. Since a fundamental configuration of this embodiment is the same as that of the first embodiment, only parts of the configuration characteristic to this embodiment will be explained. FIGS. 6A through 6D are diagrams showing an ink residual quantity detection system of this embodiment. FIG. 6A is an outline block diagram of the ink residual quantity detection system, FIG. 6B is an outline perspective diagram of the same, FIG. 6C is an explanatory diagram of an operation in the case of the presence of the ink, and FIG. 6D is a diagram of an operation in the case of the absence of the ink. Note that the same constituents of FIGS. 1A to 1C are given the same reference numerals.

Unlike the first embodiment, the light shielding part 7 is not provided in this embodiment. Moreover, an optical prism 26 for detecting the existence or absence of the ink optically has the interface 3 and an interface 8, and the luminescent material 4 is provided between the interfaces 3 and 8. As shown in FIG. 6C, when the ink 6 exists in an ink tank 25, the incident light 12 of the wavelength λ1 from the light source 1 is refracted at the interface 3, becomes the refracted light 13 of the wavelength λ1, and does not reach the light receiving part 2.

Although there is a case where the light 14 generated through scattering of the incident light 12 and the light 15 generated by reflection thereof at the ink 6 surface (including light reflected at another interface) reach the light receiving part 2, the light receiving part 2 does not recognize these rays of light because their wavelength is λ1. Moreover, although there is a possibility that the light 16 of the wavelength λ1 scattered in the interior of the prism 26 and at the interface 3 may reach the luminescent material 4, an excited part of the luminescent material is small because it is very weak light. Therefore, the false detection caused by this light emission can be avoided by setting the threshold of the quantity of light appropriately.

As shown in FIG. 6D, when the ink does not exist in the ink tank 25, the incident light 12 undergoes total reflection at the interface 3, and becomes the totally reflected light 17 of the wavelength λ1, which is irradiated on the luminescent material 4. When this is done, the luminescent material 4 is excited by the totally reflected light 17, and emits the light 18 of the wavelength λ2 which is different from the wavelength λ1. The light 18 emitted by the luminescent material 4 and light 19 (including both of the wavelengths λ1 and λ2) that underwent total reflection at the interface 8 reach the light receiving part 2. The light receiving part 2 selectively detects the light 18 (wavelength λ2) and a component of the wavelength λ2 of the light 19 and recognizes that the ink 6 does not exist in the ink tank 25.

Thus, the light source 1 emitting the first wavelength and the light-receiving part 2 for receiving the light of the second wavelength are provided. Then, the light of the first wavelength from the light source 1 is configured to be irradiated on the luminescent material 4 that is provided in the ink tank and emits the light of the second wavelength using the optical prism 26 only when the ink 6 does not exist in the ink tank 5. By this, the luminescent material 4 emits the light of the second wavelength and the light receiving part receives this light of the second wavelength. Thereby, it is recognized that the ink dose not exist in the ink tank. Thus, the ink tank and the printing apparatus that are capable of detecting the ink residual quantity in the ink tank optically with high accuracy are able to be implemented.

Third Embodiment

Below, a third embodiment of the present invention will be explained with reference to the drawings. Since a fundamental configuration of this embodiment is the same as those of the first and second embodiments, only characteristic parts of the configuration will be explained.

Figure 7A:
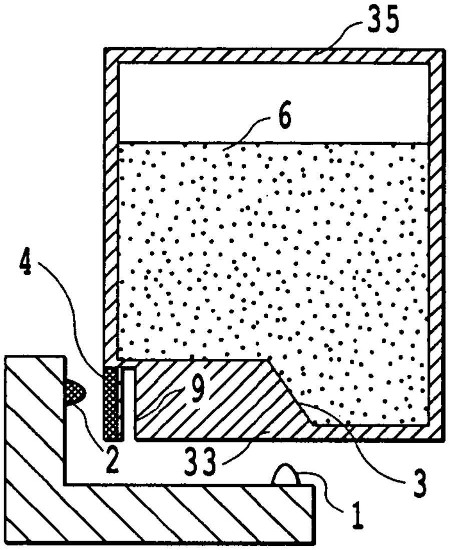
FIG. 7A is an outline block diagram of an ink residual quantity detection system according to a third embodiment.
Figure 7B:
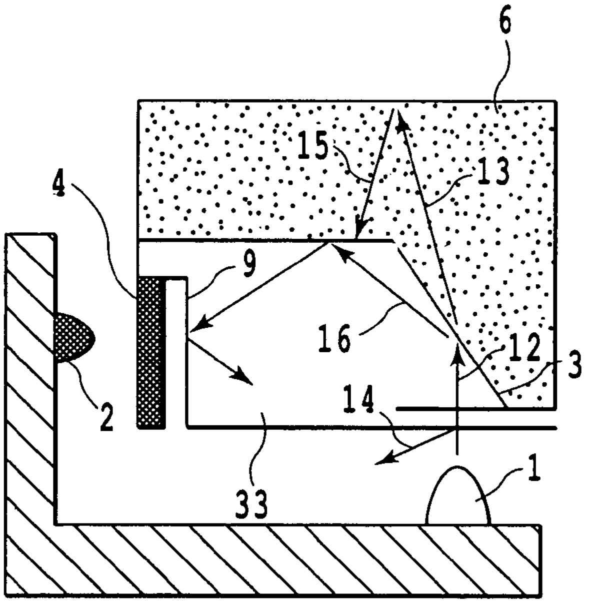
FIG. 7B is an explanatory diagram of an operation of the ink residual quantity detection system of FIG. 7A in the case of the presence of ink.
Figure 7C:
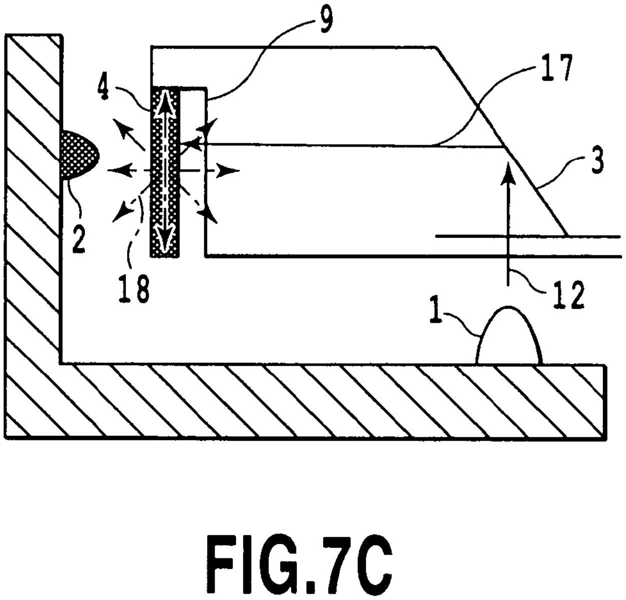
FIG. 7C is an explanatory diagram of an operation of the ink residual quantity detection system of FIG. 7A in the case of the absence of ink.

FIGS. 7A through 7C are diagrams of an ink residual quantity detection system of this embodiment, in which FIG. 7A is an outline block diagram of the ink residual quantity detection system, FIG. 7B is a diagram of its operation in the case of the presence of the ink, and FIG. 7C is a diagram of an operation in the case of the absence of the ink. The same reference numerals are given to the same constituents these figures as are given to those constituents in FIGS. 6A through 6D and those in FIGS. 1A through 1C.

In an ink tank 35 of this embodiment, an interface 9 is provided between the luminescent material 4 and an optical prism 33 for detecting the presence or absence of the ink 6. As shown in FIG. 7B, when the ink 6 exists in the ink tank 35, the incident light 12 of the wavelength λ1 from the light source 1 is refracted at the interface 3, becomes the refracted light 13 of the wavelength λ1, and does not reach the light-receiving part 2.

Although there is a case where the light 14 generated through scattering of the incident light 12 and the light 15 generated by reflection thereof at the ink 6 surface (including light generated through reflection at another interface) reach the light-receiving part 2, the light-receiving part 2 does not recognize these rays of light because their wavelength is λ1. Moreover, there is a possibility that the light 16 (wavelength λ1) scattered in the interior of the prism 33 and at the interface 3 may reach the luminescent material 4. However, such light is refracted or scattered at the interface 9, and hardly excites the luminescent material 4. Even if the luminescent material 4 is excited and emits the light of the wavelength λ2, the false detection can be avoided by setting the threshold of the quantity of light in the light-receiving part 2 appropriately. Moreover, since the quantity of light reaching the luminescent material 4 is small, it becomes possible to make a value of the threshold smaller than those of the first and second embodiments.

When the ink 6 does not exist in the ink tank 35, as shown in FIG. 7C, the incident light 12 undergoes total reflection at the interface 3, becomes the total reflection light 17 of the wavelength λ1, which is irradiated on the luminescent material 4. Since the total reflection light 17 comes incident on the interface 9 perpendicularly, it is irradiated on the luminescent material 4 almost without being scattered or refracted because of the ability of the interface between the prism and the outside environment to hold a straight line of light. When this is done, the luminescent material 4 is excited by the total reflection light 17 (wavelength λ1), and emits the light 18 of the wavelength λ2 different from the wavelength λ1. The light 18 emitted by the luminescent material 4 and the total reflection light 17 reach the light receiving part 2. The light receiving part 2 selectively detects the light 18 of the wavelength λ2, and recognizes that the ink 6 does not exist in the ink tank 35.

As described above, the light source 1 for emitting the light of the first wavelength and the light-receiving part 2 for receiving the light of the second wavelength are provided. Then the light of the first wavelength from the light source 1 is configured to be irradiated on the luminescent material 4 that is provided in the ink tank 5 and emits the light of the second wavelength using the optical prism 33 only when the ink 6 does not exist in the ink tank 5. With this configuration, the luminescent material 4 emits the light of the second wavelength and the light-receiving part receives this light of the second wavelength, and therefore it is recognized that the ink does not exist in the ink tank. In this way, the ink tank and the printing apparatus each of which is capable of detecting the ink residual quantity in the ink tank optically with high accuracy are able to be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions as which fail within the scope of the appended claims.

This application claims the benefit of Japanese Patent Application No. 2008-161760, filed Jun. 20, 2008, which is hereby incorporated by reference herein in its entirety.

What is claimed is:

1. An ink tank comprising:

an ink-containing part having an inside configured to contain ink; and an optical detector configured to optically detect a presence or an absence of ink in the ink-containing part, wherein the optical detector comprises:

a luminescent material;

a light-reflecting part configured to reflect irradiation light irradiated from an outside of the ink-containing part onto the luminescent material, so that the luminescent material is excited by the light that has been reflected by the light-reflecting part and emits light of a wavelength that is different from a wavelength of the irradiation light; and a light-shielding part configured to shield the luminescent material from refracted light when ink is present in the ink-containing part, wherein the luminescent material receives the reflected light from the light-reflecting part and emits the light of the different wavelength when ink is absent from the ink-containing part.

2. An ink tank comprising:

an ink-containing part having an inside configured to contain ink; and an optical detector configured to optically detect a presence or an absence of ink in the ink-containing part, wherein the optical detector comprises:

a luminescent material; and a light-reflecting part formed at an interface between the ink-containing part and a prism, and configured to reflect irradiation light irradiated from the outside of the ink-containing part onto the luminescent material, so that the luminescent material is excited by the light that has been reflected by the light reflecting part and emits light of a wavelength that is different from a wavelength of the irradiation light when ink is not present in the ink-containing part, and further configured to refract the irradiation light so as not to reflect the irradiation light to the luminescent material when ink is present in the ink-containing part.

3. The ink tank according to claim 2, wherein the luminescent material is provided in the interior of the prism.

4. The ink tank according to claim 2, wherein the luminescent material is provided outside the prism.

5. A method of detecting the presence or absence of ink in an ink tank, comprising:

irradiating light with a first wavelength from a light source;

directing the irradiated light into a prism in the ink tank, the prism having a refractive index chosen so that if the prism has an interface with ink, the irradiated light is refracted through that interface, and if the prism has an interface with air, the irradiated light is totally internally reflected from that interface, the prism containing a luminescent material that emits light with a second wavelength when the irradiated light with the first wavelength is absorbed by the luminescent material;

detecting light emerging from the prism; and determining, from the emerging light, whether the light has been refracted and ink is present in the ink tank, or the light has been totally internally reflected onto the luminescent material and ink is absent from the ink tank.

6. A method according to claim 5, further comprising:

displaying a notification indicating whether ink is present or absent in the ink tank based on the result of the determining step.

* * * * *

7. An ink tank comprising:

a case;

an ink-containing part that is capable of containing an ink; and a light-reflecting part used for optically detecting a presence or an absence of ink in the ink-containing part, wherein the light-reflecting part reflects irradiation light irradiated from the outside of the ink-containing part and irradiates reflected reflection light to luminescent material fixed on the case, and wherein the luminescent material is excited by the reflection light that has been irradiated and emits light of a wavelength that is different from a wavelength of the irradiation light.

8. An ink tank according to claim 7, wherein the light-reflecting part totally reflects the irradiation light to the luminescent material when the ink is absent from the ink-containing part and refracts the irradiation light when the ink is present in the ink-containing part.

* * * * *